United States Patent [19]

Perregaux

[11] 4,217,160

[45] Aug. 12, 1980

[54] THIN POLARIZER FOR AN ELECTRO-OPTICALLY ACTIVATED CELL AND METHOD FOR MAKING SAME

[75] Inventor: Alain Perregaux, Wettingen, Switzerland

[73] Assignee: BBC Brown, Boveri & Company, Limited, Baden, Switzerland

[21] Appl. No.: 958,362

[22] Filed: Nov. 7, 1978

[30] Foreign Application Priority Data

Dec. 16, 1977 [CH] Switzerland ............ 15491/77

[51] Int. Cl.$^2$ ............................................. B44C 1/20
[52] U.S. Cl. ......................... 156/239; 156/235; 156/230; 427/146; 427/163; 350/158; 350/155; 350/337; 350/352; 428/1; 428/40; 428/42; 428/352; 428/914; 428/534; 428/510; 350/339 R
[58] Field of Search ............ 428/1, 534, 40, 42, 428/352, 510, 914; 350/337, 352, 339, 155, 158; 427/163, 146; 156/239, 235, 230

[56] References Cited

U.S. PATENT DOCUMENTS

| | | | |
|---|---|---|---|
| 2,524,286 | 10/1970 | Dreyer | 428/1 |
| 3,019,131 | 1/1962 | Haas | 427/163 |
| 3,097,106 | 7/1963 | Blout | 427/163 |
| 3,719,544 | 3/1973 | Buzzell | 350/155 |
| 3,722,998 | 3/1973 | Morse | 96/44 |
| 3,806,462 | 4/1974 | Bloom | 350/155 |
| 3,833,289 | 9/1974 | Schuler | 350/155 |
| 4,025,688 | 5/1977 | Nagy | 428/1 |
| 4,066,337 | 1/1978 | Kobale | 428/1 |
| 4,068,923 | 1/1978 | Toida | 428/1 |

Primary Examiner—Ellis P. Robinson
Attorney, Agent, or Firm—Oblon, Fisher, Spivak, McClelland & Maier

[57] ABSTRACT

A polarizer of particularly small thickness for an electro-optically activated cell, wherein a polarization foil is provided between an adhesion layer causing the adhesion to the cell and a protective layer providing protection from external influences. The small thickness of the polarizer is achieved by the use of a particularly thin protective layer consisting of a curable lacquer of the type which is used for coating packaging foils in the foodstuffs packaging industry, thereby reducing the thickness of the polarizer provided with protective layers on both sides to much less than 50 μm, without the polarizer sacrificing its outstanding resistance to chemical and mechanical influences. The polarizer is produced by providing the polarization foil of a transfer polarizer, which can be pulled off a support foil, on the side remote from the support foil, with the layer causing the adhesion thereof to the cell, removing the support foil, providing the polarization foil with a protective layer on the side previously attached to the support foil, and applying a support foil provided with the adhesive layer to the protective layer.

8 Claims, 2 Drawing Figures

THIN POLARIZER FOR AN ELECTRO-OPTICALLY ACTIVATED CELL AND METHOD FOR MAKING SAME

BACKGROUND OF THE INVENTION

1. Field of the Invention

The present invention relates to a polarizer for an electro-optically activated or activatable cell with a polarization foil which is placed between a layer causing the adhesion to the cell and a layer giving protection against external influences, and to a method of producing such a polarizer.

2. Description of the Prior Art

Polarizers of the above-mentioned type are required on each of the two sides of an electro-optically activated cell, such as e.g., a twisted nematic liquid crystal cell utilizing the Schadt-Helfrich effect. Layer-shaped plastics polarizers are used preferably for this purpose. These polarizers are substantially constructed of two parts namely a polarizing or optically active layer, customarily foil-shaped, and either a single support foil present on one side of the polarizing layer and performing a protective function, or two support foils provided on the two sides of the polarizing layer. The first mentioned polarizer is customarily designated a "simple" or "asymmetrical polarizer" and the second-mentioned a "symmetrical" or "sandwich polarizer".

In the customary commercial construction, simple polarizers exhibit an approximately 130 μm thick cellulose acetobutyrate (CAB) support foil, and as a polarizing layer a stretched polyvinyl alcohol (PVA) foil, such as is produced e.g., by the Polaroid Corporation, Polarizer Department, 20 Ames Street, Cambridge, Mass., 02139, USA and, Foster Grant Corporation, Ziralo Division, Van Nuys, California, USA, or a stretched polyvinylbutyrate (PVB) foil such as is produced, e.g., by American Polarizers, 141 South Seventh Street, Reading, Penn. 19603, USA. The thickness of the polarizing layer is between 10 and 20 μm, so that the thickness of the polarizer is approximately 140 μm.

When such simple polarizers are used in liquid crystal cells, these polarizers are provided on the polarizer foil side (PVA or PVB side) with a layer of a self-adhesive agent, so as to achieve the adhesion to the cell as well as the protection of the polarizing layer.

Sandwich polarizers exhibit, in their customary commercial construction, a stretched PVA foil which is provided on both sides with approximately 75 μm thick cellulose triacetate support foils. Such polarizers, produced e.g. by Sanritsu Electric Co., Ltd., 1-30-13 Narimasu, Itabashi-ku, Tokyo, Japan are therefore approximately 170 μm thick. They are characterized by high mechanical stability (no distortion), under frequent temperature variations and in the presence of moisture, and also high chemical stability in heat and moisture (little bleaching). There are also sandwich polarizers in which the polarization foil is arranged between two approximately 50 μm thick acryplastics support foils. Polarizers of this type are characterized by a thickness of only 120 μm, but are extremely sensitive to mechanical influences due to the softness of the acrylplastics foils.

In addition to the simple and the sandwich polarizers, there is a further polarizer, known as a "transfer polarizer", which is produced e.g., by the above-mentioned American Polarizers. This so-called "transfer polarizer" is very similar to the simple polarizer, from which it differs however in that the polarizing layer adheres only lightly to the support foil. The polarizing layer of this transfer polarizer can be applied to a glass surface without an adhesive medium, and the support foil can then be removed. The transfer polarizer is characterized by its small thickness of only 20 μm, but it is unsuitable for use in liquid crystal cells due to consideration of cost because of the complicated process of application to the glass surface, and is furthermore extremely susceptible to mechanical and chemical influences.

SUMMARY OF THE INVENTION

Accordingly, it is the object of this invention to produce a polarizer of the above-mentioned type which exhibits a smaller thickness than the known simple and sandwich polarizers, but is protected from external mechanical and chemical influences, which can be produced cheaply in an economical process and which is extremely easy to apply to liquid crystal cells.

This and other objects are achieved according to the invention by making the thickness of the protective layer smaller than 50 μm.

The method according to the invention is characterized by the fact that the polarization foil of a transfer polarizer which can be pulled off a support foil is provided on the side remote from the support foil with a layer causing the adhesion to the cell, the support foil is removed, the polarization foil is provided with a protective layer on the side previously attached to the support foil, and a support foil provided with an adhesive layer is applied on the protective layer.

The polarizer according to the invention is characterized by a small thickness, and also by the fact that its polarizing layer is protected from external influences. It therefore exhibits the advantages of the simple and sandwich polarizers and also of the transfer polarizers, but not their disadvantageous characteristics. It can furthermore be produced in an extremely simple and economical manner and is extremely easy to apply to the glass surface of electro-optically activated cells.

Thin polarizers are particularly important for clock or watch displays, because e.g., flat wristlet watches are preferred by the buyer from the aesthetic standpoint and also for greater comfort in wear.

The polarizer according to the invention is particularly well protected from external influences if the protective layer consists of moisture-repellent cured lacquer and exhibits a thickness of not more than 15 μm. In this case it has been found particularly successful for the lacquer to be a lacquer of the type which is required for over-painting packaging foils in the foodstuffs packaging industry, and for the protective layer to exhibit a thickness of not more than 5 μm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
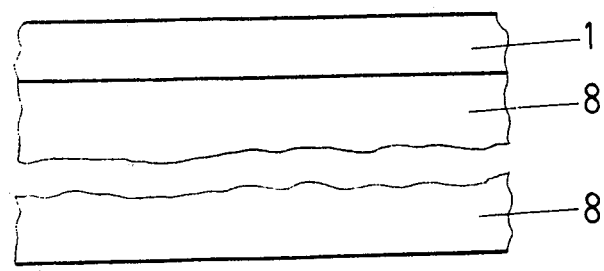
FIG. 1 is a cross-sectional view taken through a known transfer polarizer.

Referring now to the drawings, wherein like reference numerals designate identical or corresponding parts throughout the several views, and more particularly to FIG. 1, thereof, there is seen a conventional "transfer polarizer" which exhibits a polarization foil 1 of 10 $\mu$m, but not more than 30 $\mu$m thickness and a support foil 8. According to the invention, this polarizer is first of all provided on the side of the polarization foil 1 with an optional protective layer 2 and an adhesive layer 3, approximately 20 $\mu$m, but nore more than 30 $\mu$m, thick, shown in FIG. 2, of a polyacrylate adhesive. Upon the adhesive layer 3 there is then applied a masking foil 4 shown in FIG. 2, comprising a slightly siliconised polyester, polypropylene or polyvinylchloride or a corresponding material with a thickness of between 20 and 150 $\mu$m. It is decisive in this context that the adhesive action of the adhesive layer 3 on the masking foil 4 is weaker than on the polarization foil 1 or the protective layer 2. The support foil 8, which is unsuitable for use in liquid crystal cells due to its insufficient adhesion to the polarization foil 1, its thickness and its rigidity, is then removed in a laminating machine and a protective layer 5 of approximately 5 $\mu$m, but not more than 15 $\mu$m thick, illustrated in FIG. 2, consisting of a moisture-repellent lacquer, is doctored onto the polarization foil 1 on the side of the polarizer remote from the adhesive layer 3, and cured. A nitro lacquer of the type used for over-painting food packaging foils has been found successful. For Example, a nitro lacquer comprising approximately 20% nitrocellulose, 5% dibutylphthatlate and 75% solvents (a mixture of methylacetate, methylethylketone and ethanol) has been found suitable. The application of the protective layer 2 may be performed with advantage, not only by doctoring on, but also by rolling on or spraying on.

Figure 2:
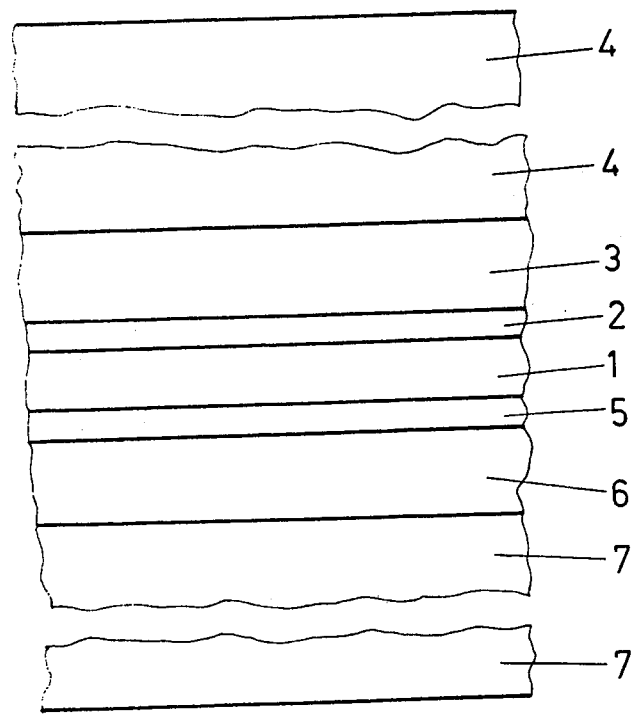
FIG. 2 is a cross-sectional view taken through a polarizer according to the invention.

Optimum protection of the polarization foil from external mechanical and chemical influences is obtained if, before the application of the adhesive layer 3, the protective layer 2 shown in FIG. 2 is applied in corresponding manner.

A further layer 6, illustrated in FIG. 2, is applied on the protective layer 5 which causes the adhesion of a support foil 7 illustrated in FIG. 2 to the protective layer 5. It is important in this context that the adhesive action of the layer 6 on the protective layer 5 is weaker than on the support layer 7. The thickness of this layer 6 and of the support foil 7 are not critical, values of 30 $\mu$m for the layer 6 and of 20 to 150 $\mu$m for the support foil 7 may be designated as typical. The support foil 7 may be any commercially available plastics foil, e.g., a PVC foil, which can be coated with a self-adhesive agent. The adhesive layer 6 is conveniently applied first of all to the support foil 7 and not to the protective layer 5. When the support foil 7 is pulled off the polarizer which has been pressed onto the glass surface of a liquid crystal cell after removing the masking foil 4 with the adhesive layer 3, the adhesive layer 6 remains adhering to the surface of the support foil 7, and the polarizer surface is free of adhesive residues.

The following thickness measurements are obtained for a polarizer according to the invention applied to an electro-optically activatable cell:

| LAYER | MAXIMUM LAYER THICKNESS ($\mu$m) | TYPICAL LAYER THICKNESS ($\mu$m) |
| --- | --- | --- |
| Adhesive layer 3 | 30 | 20 |
| Protective layer 2 | 15 | 5 |
| Polarization foil 1 | 30 | 10 |
| Protective layer 5 | 15 | 5 |
| TOTAL | 90 | 40 |

In the case of a known simple or sandwich polarizer, after there has been applied a 20-30 $\mu$m thick adhesive layer to the surface of the liquid crystal cell, an overall thickness of 150-170 $\mu$m is obtained, so that with the polarizer according to the invention a thickness savings of up to 130 $\mu$m, i.e., up to 260 $\mu$m per cell is typically gained.

The polarizer according to the invention may also be used in PLZT and double refraction—e.g., magneto-optical displays, in reflection-blocking filters (polarizer combined with quarter-wavelength filter) for enhancing contrast in light-emitting displays, in sun spectacles and in photographic cameras.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for producing an electro-optically activated cell having a thin polarization foil laminate applied to a cell plate by means of a first adhesion layer, comprising the steps of:

applying a first adhesion layer to a polarization foil which is attached to a first support foil, said first adhesion layer having a weaker adhesion action on the surface of said cell plate than on a masking foil to be later applied thereto;

applying said masking foil to said first adhesion layer;

removing said first support foil from said polarization foil;

applying a protective layer less than 50 $\mu$m thick to the side of said polarization foil opposite said masking foil;

applying a second support foil with a second adhesion layer to said protective layer with the second adhesion layer adhering to said protective layer, said second adhesion layer having a weaker adhesion action on said protective layer than on said second support foil;

removing said masking foil;

applying the composite lamination produced by the preceding step to the cell plate with said first adhesion layer contacting said cell plate and causing adhesion thereto, and removing said second support foil together with said second adhesion layer from said protective layer.

2. A method according to claim 1 wherein:

said protective layer is less than 15 $\mu$m thick and is applied by spraying or rolling a curable nitro lacquer.

3. A method according to claim 2 wherein:

said masking foil is a siliconized polyester, polypropylene or polyvinylchloride;

said second support foil is a plastic foil and said adhesion layers are a polyacrylate.

4. A method according to claim 3, wherein:
said curable nitro lacquer comprises approximately 20% nitrocellulose, 5% dibutylphthalate and 75% solvents.

5. A method for producing an electro-optically activated cell having a thin polarization foil laminate applied to a cell plate by means of a first adhesion layer, comprising the steps of:

applying a first protective layer less than 50 μm thick to a polarization foil which is attached to a first support foil;

applying a first adhesive layer to the first protective layer, said first adhesive layer having a weaker adhesive action on the surface of said first protective layer than on the surface of a masking foil to be later applied to said first adhesive layer;

applying said masking foil to said first adhesion layer;

removing said first support foil from said polarization foil;

applying a second protective layer less than 50 μm thick to the side of said polarization foil opposite said masking foil;

applying a second support foil with a second adhesion layer to said second protective layer with the second adhesion layer adhering to said second protective layer, said second adhesion layer having a weaker adhesion action on said second protective layer than on said second support foil;

removing said masking foil;

applying the composite lamination resulting after the preceding step to the cell plate with said first adhesion layer contacting said cell plate and causing adhesion thereto; and removing said second support foil together with said second adhesion layer from said second protective layer.

6. A method according to claim 5, wherein:
said protective layers are less than 15 μm thick and are applied by spraying or rolling a curable nitro lacquer.

7. A method according to claim 6, wherein:
said masking foil is a siliconized polyester, polypropylene or polyvinylchloride;
said second support foil is a plastic foil; and said adhesion layers are a polyacrylate.

8. A method according to claim 7, wherein:
said curable nitro lacquer comprises approximately 20% nitrocellulose, 5% dibutylphthalate and 75% solvents.

* * * * *